(12) United States Patent  
Wu

(10) Patent No.: US 11,713,198 B2  
(45) Date of Patent: Aug. 1, 2023

(54) MEDICINE CHECKING ASSEMBLY LINE

(71) Applicant: ZHEJIANG UNIVERSITY, Zhejiang (CN)

(72) Inventor: Shengjie Wu, Zhejiang (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 244 days.

(21) Appl. No.: 17/338,183

(22) Filed: Jun. 3, 2021

(65) Prior Publication Data

US 2021/0292101 A1    Sep. 23, 2021

Related U.S. Application Data

(63) Continuation of application No. PCT/CN2020/114929, filed on Sep. 12, 2020.

(51) Int. Cl.
| | |
|---|---|
| *B65G 47/46* | (2006.01) |
| *B65G 47/248* | (2006.01) |
| *A61J 1/20* | (2006.01) |
| *B65G 47/38* | (2006.01) |

(52) U.S. Cl.
CPC .............. *B65G 47/46* (2013.01); *A61J 1/20* (2013.01); *B65G 47/248* (2013.01); *B65G 47/38* (2013.01)

(58) Field of Classification Search
CPC .... B65G 47/46; B65G 47/848; B65G 47/248; B65G 47/38; B65G 47/94
USPC .......... 198/377.02, 379, 381, 294, 397, 403, 198/402, 404, 411, 414, 412
See application file for complete search history.

(56) References Cited

U.S. PATENT DOCUMENTS

| | | | | |
|---|---|---|---|---|
| 4,514,128 | A  * | 4/1985 | Hedrick ................ | B65H 33/08 |
| | | | | 271/189 |
| 4,925,173 | A  * | 5/1990 | Lindblom ............ | B65H 39/105 |
| | | | | 270/52.14 |
| 9,944,466 | B2 * | 4/2018 | Disch .................. | A47L 15/0092 |

FOREIGN PATENT DOCUMENTS

CN            103771067 A  *  5/2014

\* cited by examiner

*Primary Examiner* — Gene O Crawford  
*Assistant Examiner* — Lester Rushin, III

(57) ABSTRACT

The present invention provides a medicine checking assembly line. The present invention solves a problem of low automation degree of the existing medicine checking assembly line. The medicine checking assembly line includes a conveying device, a turnover device, a separation device, a medicine bottle recycling device, a medicine bag stacking device and a medicine basket stacking device, which are connected sequentially. The conveying device is used for transferring medicine baskets between medicine dissolving personnel and medicine checking personnel; the turnover device is used for turning over the medicine baskets; the separation device is used for separating the medicine baskets, medicine bottles and medicine bags; the medicine bottle recycling device is used for recycling the used medicine bottles; the medicine bag stacking device is used for stacking and collecting the medicine bags; and the medicine basket stacking device is used for stacking and recycling the medicine baskets.

8 Claims, 13 Drawing Sheets

MEDICINE CHECKING ASSEMBLY LINE

CROSS-REFERENCE TO RELATED APPLICATIONS

This application is a continuation of International Patent Application No. PCT/CN2020/114929, filed on Sep. 12, 2020, which claims the benefit of priority from Chinese Patent Application No. 201911298165.0, filed on Dec. 17, 2019. The content of the aforementioned applications, including any intervening amendments thereto, is incorporated herein by reference.

TECHNICAL FIELD

The present invention belongs to the technical field of medical equipment, and relates to an assembly line device, in particular to a medicine checking assembly line.

BACKGROUND OF THE PRESENT INVENTION

Medicine dissolving operation and medicine checking operation are necessary procedures before intravenous injection to patients. The medicine dissolving operation refers to a general term for manually adding a medicine into a solvent. The solvent is usually physiological saline or glucose solution. For powdery medicine, the medicine is dissolved by firstly injecting part of the solvent; and then the whole solution is injected into a solvent bag. For liquid medicine, the medicine can be directly injected into the solvent bag for dilution. The medicine checking operation is a step to inspect whether the medicine dissolving operation is correct by checking names and dosages of medicines, so as to ensure the accurate application of medicines and avoiding mistakes and errors in the dispensing of medicines caused by human factors.

In normal operation, the solvents and the medicines to be subjected to the medicine dissolving operation are placed in a medicine basket in advance and delivered to medicine dissolving personnel. After the medicine dissolving operation for the medicines and drugs in the medicine basket, the medicine dissolving personnel need to put the solvents dissolved with the drugs and the used medicine bottles back into the medicine basket, and medicine checking personnel check the solvents and medicine bottles in the medicine basket to prevent medication errors.

The medicine dissolving operation and the medicine checking operation are often completed by different personnel. Due to the shortage of medical staffs in the hospitals, the number of the medicine dissolving personnel is usually greater than that of the medicine checking personnel, so that the work of the medicine checking personnel is under load. In addition, most of the discarded medicine bottles after medicine checking operation have been manually recycled at present, so that a lot of manual labor is required, and the phenomena of scratches are easily caused in the recycling process.

SUMMARY OF THE PRESENT INVENTION

A purpose of the present invention is to provide a highly automated, economical and practical medicine checking assembly line with respect to the above problems in the prior art.

The purpose of the present invention can be achieved by the following technical solution: a medicine checking assembly line includes a conveying device, a turnover device, a separation device, a medicine bottle recycling device, a medicine bag stacking device and a medicine basket stacking device, which are connected sequentially, wherein the conveying device is used for transferring medicine baskets between medicine dissolving personnel and medicine checking personnel; the turnover device is used for turning over the medicine baskets; the separation device is used for separating the medicine baskets, medicine bottles and medicine bags; the medicine bottle recycling device is used for recycling the used medicine bottles; the medicine bag stacking device is used for stacking and collecting the medicine bags; and the medicine basket stacking device is used for stacking and recycling the medicine baskets.

Working principles of the present invention are as follows: the conveying device is arranged between the medicine dissolving personnel and the medicine checking personnel; after completing the medicine dissolving work, the medicine dissolving personnel place the medicine basket on the conveying device and conveys the medicine basket to the medicine checking personnel, wherein solvent bags with dissolved medicines are placed in the medicine basket; after passing the inspection of the medicine checking personnel, the medicine basket continues to move to the turnover device, and is turned over by the turnover device and then transferred to the separation device; the medicine basket, the medicine bottles and the medicine bags are separated from one another when the medicine basket moves on the separation device; and finally, the medicine basket and the medicine bags are collected by the stacking device. According to the present invention, the medicine dissolving personnel is in contact with the medicine checking personnel through the conveying device; the medicine dissolving personnel dissolve the medicines and place the medicines on the conveying device; the medicine checking personnel check the dissolved medicines on the conveying device, and allow the medicines to be transmitted downwards in case of no problem on the medicines, or take down the medicine basket from the assembly line for more careful proofreading in case of doubting the medicines; the medicines that pass the proofreading are conveyed to the turnover device together with the medicine basket; the medicine basket is completely turned over by the turnover device and then moves to the separation device; the medicine basket, the medicine bottles and the medicine bags are separated by the separation device; the used medicine bottles are discarded and recycled; the medicine basket is collected in the stacking device for use in the subsequent batch of medicine dissolving and medicine checking; and the medicine bags are collected in the stacking device and transported to patients for use. The medicine checking assembly line provided by the present invention reduces the manpower and time for transportation between the medicine dissolving personnel and the medicine checking personnel, and can automatically separate the medicine basket, the medicine bottles and the medicine bags after proofreading, thereby realizing high automation degree.

In the above medicine checking assembly line, the conveying device includes a conveying rack, a first conveyor belt and a first driving device for driving the first conveyor belt to run; conveying rotation shafts are arranged at both ends of the conveying rack; and the first conveyor belt is laid on the conveying rotation shafts for conveying the medicine baskets.

In the above medicine checking assembly line, the turnover device includes at least one group of turnover mechanisms. Each turnover mechanism includes a turnover plate, a stop plate, a guide plate and at least one guide rail; the turnover device is connected with a second driving device for driving the turnover plate to rotate; a rotation shaft of the second driving device is connected to the middle of the turnover plate; the turnover device is used for turning over the medicine baskets; the stop plate is used for abutting against and stopping the medicine baskets; a pulley matched with the guide rail is arranged at one end of the guide plate, and moves in the guide rail; the turnover plate is fixedly connected with the stop plate; the guide plate is rotationally connected with the stop plate; and the second driving device drives the guide plate to move while driving the turnover plate to rotate. Each guide rail includes a turnover section, a discharging section and a resetting section; when the guide plate moves to the turnover section, the guide plate is used for limiting the medicine basket; and when the guide plate moves to the discharging section, an inclined surface inclining to the separation device is formed on the guide plate, so that the medicine basket slides down to the separation device along the inclined surface.

In the above medicine checking assembly line, a plurality of conveying rollers are arranged on the turnover plates.

In the above medicine checking assembly line, each guide plate includes a rotating end and a moving end. The center of the second driving device is set as a point O; the starting point of the turnover section is set as a point A; and the terminating point of the turnover section is set as a point B. The turnover section is of an arc shape; the center of the turnover section coincides with the point O; and the radius of the turnover section is equal to a distance between the moving end and the point O when the guide plate is in a horizontal state. When the moving end is located at the point A, the guide plate is in a horizontal state; and when the moving end moves in the turnover section, the guide plate is parallel to the turnover plate, so that the point B and the point O are located at the same horizontal height.

In the above medicine checking assembly line, the terminating point of the discharging section is set as a point C; and the discharging section is tangent to the turnover section. When the moving end moves to the point C, the guide plate is inclined to the separation device.

In the above medicine checking assembly line, an angle formed between the stop plate and the turnover plate is 45 degrees; and when the moving end moves to the point C, the guide plate and the stop plate are in a straight line.

In the above medicine checking assembly line, the reset section includes a first reset section and a second reset section. A connecting point between the first reset section and the second reset section is set as a point D. The first reset section is of an arc shape and is tangent to the discharging section; and the second reset section is tangent to the first reset section and the turnover section, respectively.

In the above medicine checking assembly line, the separation device includes two medicine basket conveyor belts and at least two medicine bag conveyor belts arranged between the medicine basket conveyor belts. A gap distance between the medicine basket conveyor belts is greater than the length of the medicine bags. The medicine bag conveyor belts include medicine bag bearing conveyor belts and medicine bag discharging conveyor belts; the medicine bag bearing conveyor belts and the medicine basket conveyor belts are located on the same plane; and the medicine bag discharging conveyor belts are inclined towards the medicine bag stacking device. The medicine bottle recycling device is arranged at starting ends of the medicine basket conveyer belts; and the medicine basket stacking device is arranged at terminating ends of the medicine basket conveyor belts.

In the above medicine checking assembly line, the medicine basket stacking device includes a basket body and a limiting block arranged inside the basket body; an elastic piece is arranged between the basket body and the limiting block; and the medicine basket enters the basket body and is buckled on the limiting block. Each medicine bag stacking device includes a basket body and a stacking platform arranged inside the basket body; and an elastic piece is arranged between the stacking platform and the limiting block.

Compared with the prior art, the present invention has the advantages of high automation degree, economy, practicability and the like.

In the figures, 1. conveying device; 2. turnover device; 3. separation device; 4. medicine bottle recycling device; 5. medicine bag stacking device; 6. medicine basket stacking device; 8. first conveyor belt; 9. first driving device; 10. conveying rotation shaft; 11. turnover mechanism; 12. turnover plate; 13. stop plate; 14. guide plate; 15. guide rail; 16. second driving device; 17. pulley; 18. turnover section; 19. discharging section; 20. reset section; 21. conveying roller; 22. first reset section; 23. second reset section; 24. medicine basket conveyor belt; 25. medicine bag conveyor belt; 26. medicine bag bearing conveyor belt; 27. medicine bag discharging conveyor belt; 28. basket body; 29. limiting block; 30. elastic piece; and 31. stacking platform.

DETAILED DESCRIPTION OF THE PRESENT INVENTION

The following specific embodiments of the present invention are used for further describing the technical solution of the present invention in combination with the accompanying drawings. However, the present invention is not limited to these embodiments.

Figure 1:
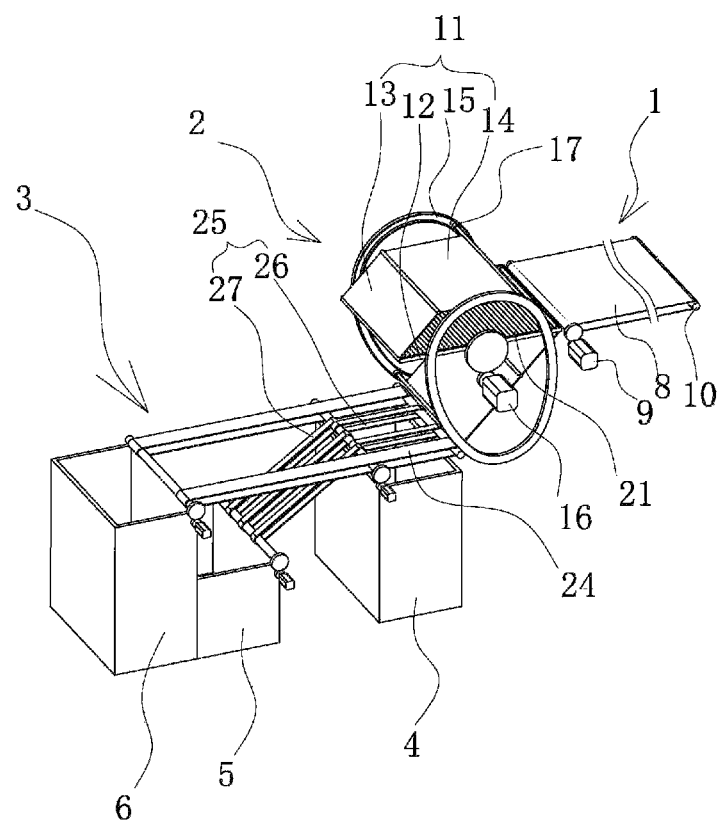
FIG. 1 is a structural schematic diagram of the present invention.
Figure 2:
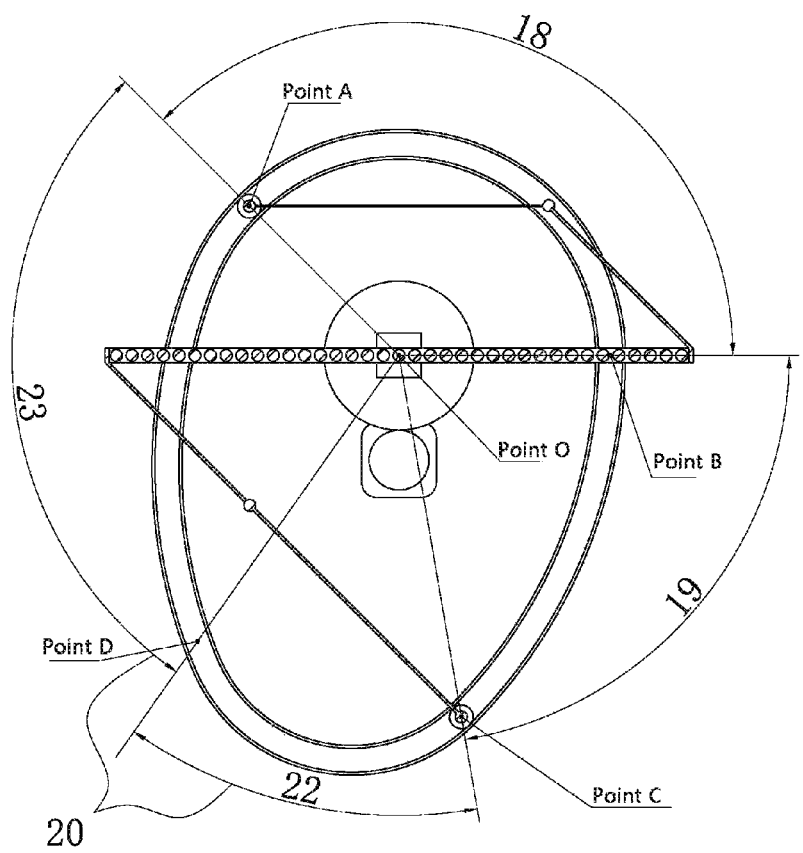
FIG. 2 is a sectional structural schematic diagram of a turnover device according to the present invention at a turnover angle of 0 degree.
Figure 3:
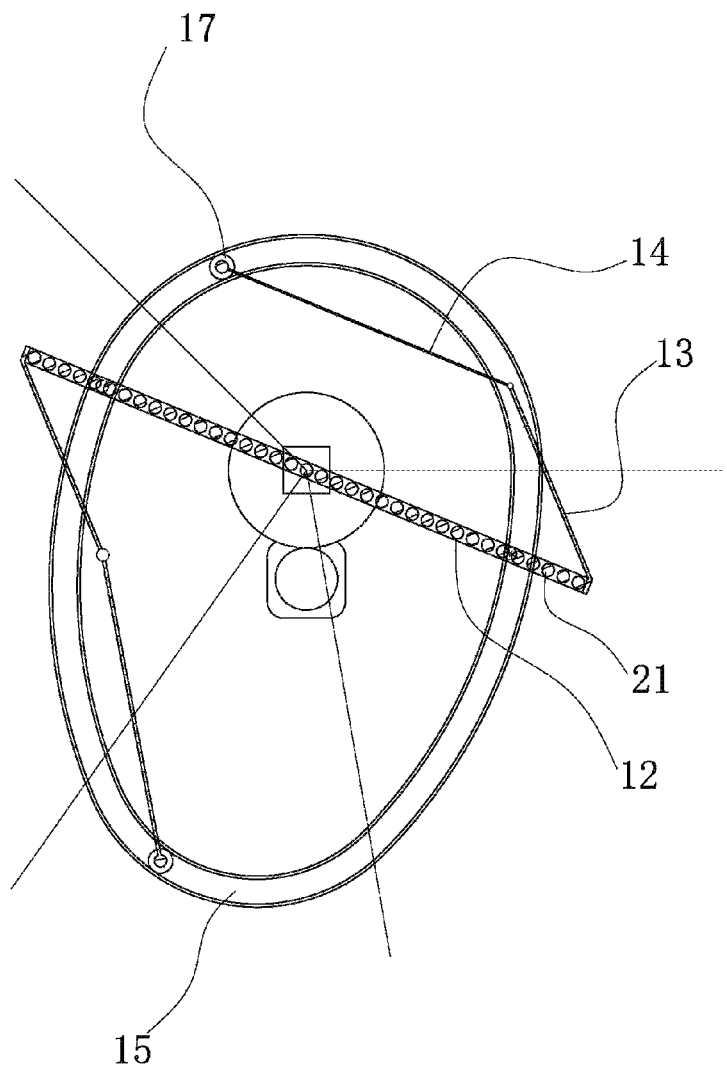
FIG. 3 is a sectional structural schematic diagram of the turnover device according to the present invention at a turnover angle of 22.5 degrees.
Figure 4:
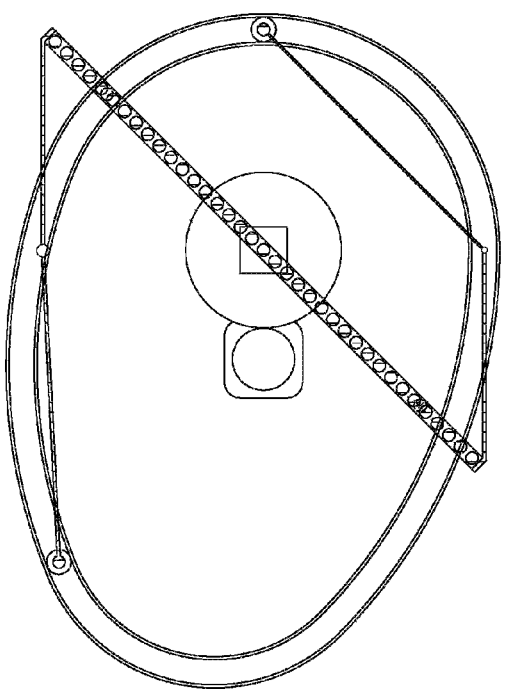
FIG. 4 is a sectional structural schematic diagram of the turnover device according to the present invention at a turnover angle of 45 degrees.
Figure 5:
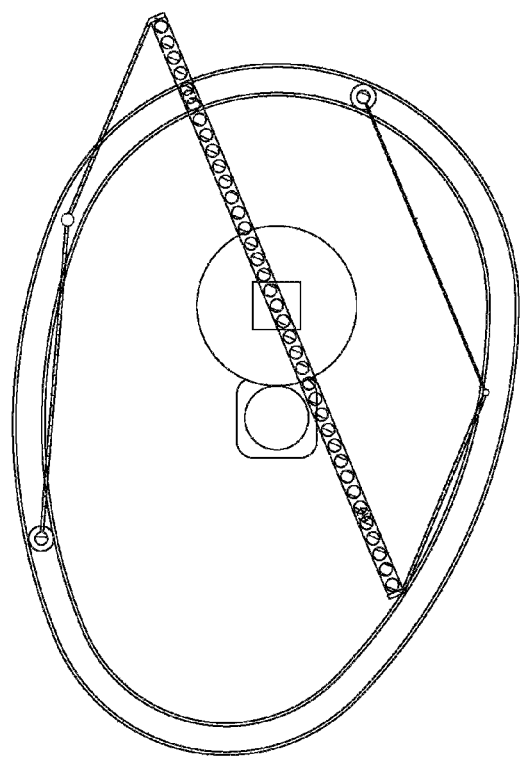
FIG. 5 is a sectional structural schematic diagram of the turnover device according to the present invention at a turnover angle of 67.5 degrees.
Figure 6:
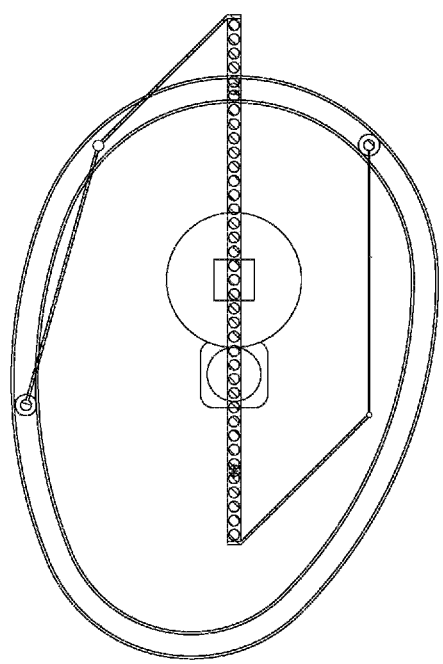
FIG. 6 is a sectional structural schematic diagram of the turnover device according to the present invention at a turnover angle of 90 degrees.
Figure 7:
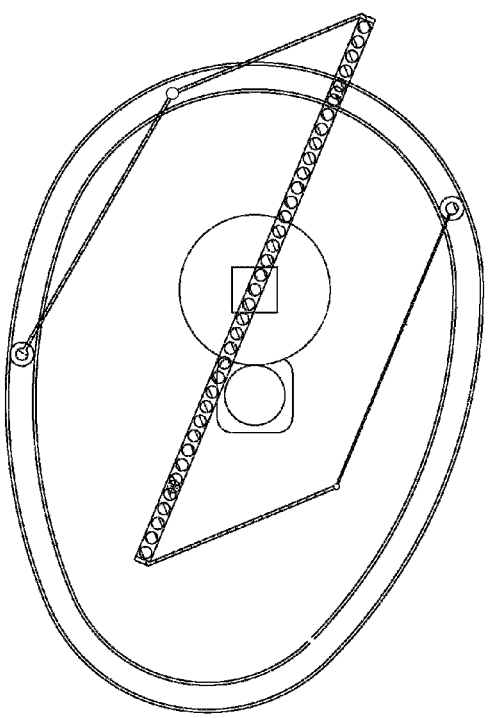
FIG. 7 is a sectional structural schematic diagram of the turnover device according to the present invention at a turnover angle of 112.5 degrees.
Figure 8:
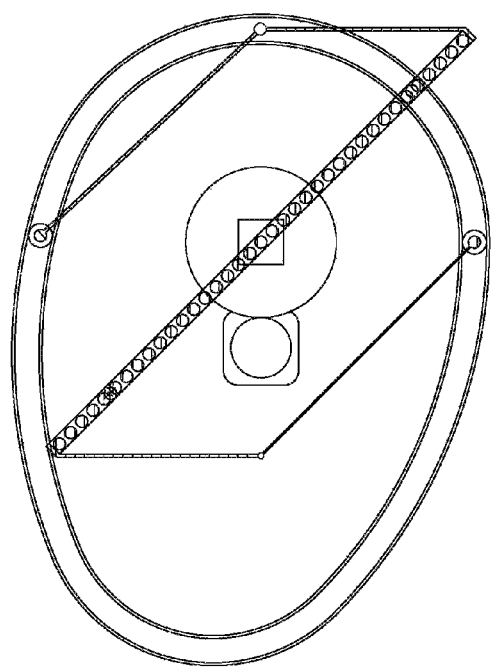
FIG. 8 is a sectional structural schematic diagram of the turnover device according to the present invention at a turnover angle of 135 degrees.
Figure 9:
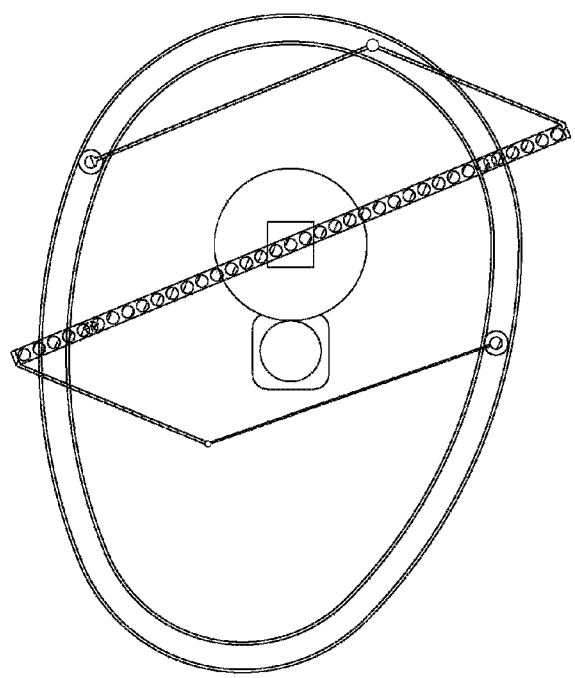
FIG. 9 is a sectional structural schematic diagram of the turnover device according to the present invention at a turnover angle of 157.5 degrees.
Figure 10:
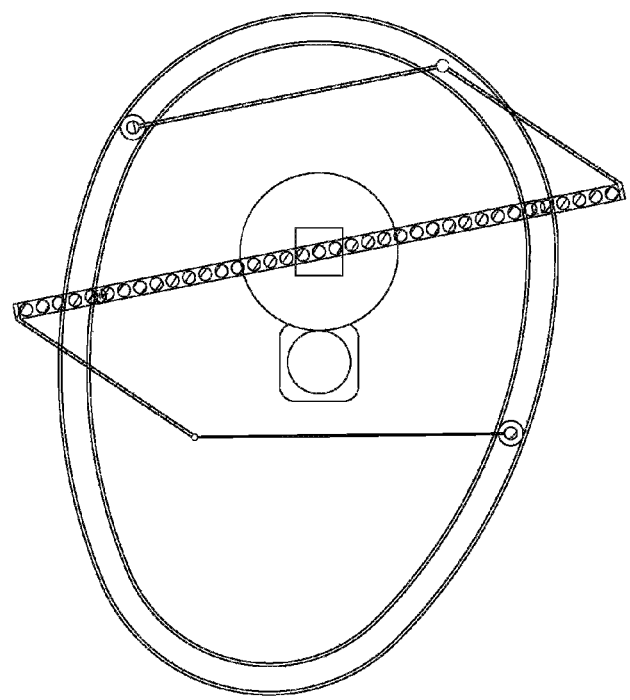
FIG. 10 is a sectional structural schematic diagram of the turnover device according to the present invention at a turnover angle of 168.75 degrees.
Figure 11:
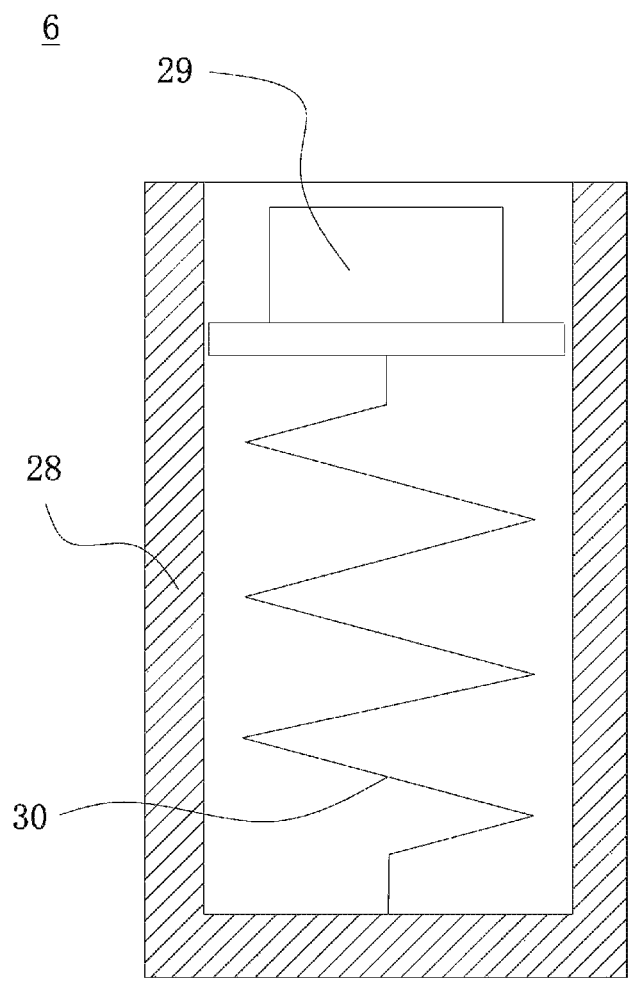
FIG. 11 is a structural schematic diagram of a medicine basket stacking device according to the present invention.
Figure 12:
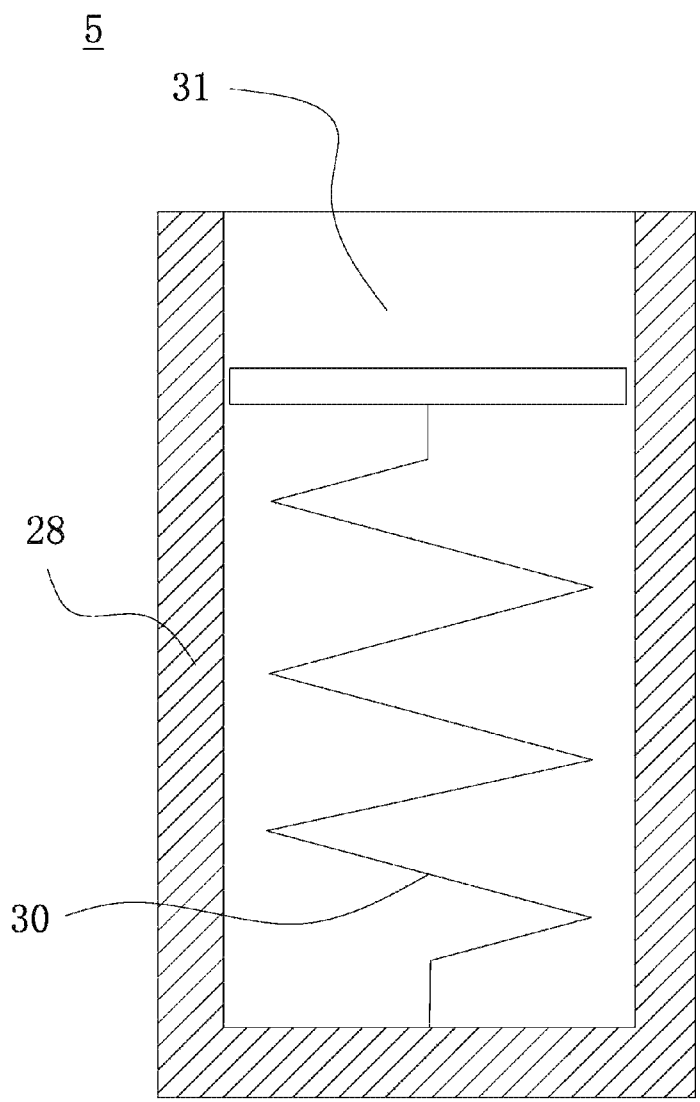
FIG. 12 is a structural schematic diagram of a medicine bag stacking device according to the present invention.
Figure 13:
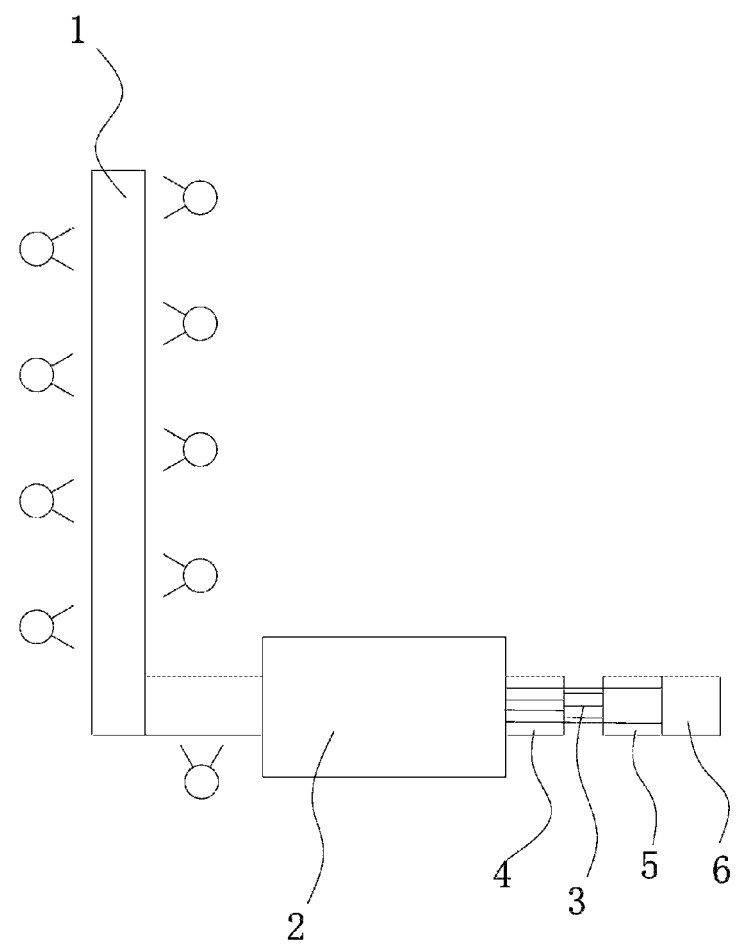
FIG. 13 is a structural schematic diagram of the present invention in an overlook direction.

As shown in FIGS. 1-13, the medicine checking assembly line includes a conveying device 1, a turnover device 2, a separation device 3, a medicine bottle recycling device 4, a medicine bag stacking device 5 and a medicine basket stacking device 6, which are connected sequentially. The conveying device 1 is used for transferring medicine baskets between medicine dissolving personnel and medicine checking personnel; the turnover device 2 is used for turning over the medicine baskets; the separation device 3 is used for separating the medicine baskets, medicine bottles and medicine bags; the medicine bottle recycling device 4 is used for recycling the used medicine bottles; the medicine bag stacking device 5 is used for stacking and collecting the medicine bags; and the medicine basket stacking device 6 is used for stacking and recycling the medicine baskets.

More specifically, the conveying device 1 includes a conveying rack, a first conveyor belt 8 and a first driving device 9 for driving the first conveyor belt 8 to run. Conveying rotation shafts 10 are arranged at both ends of the conveying rack; and the first conveyor belt 8 is laid on the conveying rotation shafts 10 for conveying the medicine baskets. The conveying device 1 is used for conveying the medicine basket to the medicine dissolving personnel at first, so that the medicine dissolving personnel can dissolve medicines conveniently; the medicine dissolving personnel place the medicine basket with the dissolved medicines on the conveying device 1; the medicine basket is conveyed to the medicine checking personnel through the conveying device 1; the medicine checking personnel confirm whether the medicines are correct; and if the medicines are correct, the medicine basket is put back to the conveying device 1, and the conveying device 1 continues to convey the medicine basket to the turnover device 2.

More specifically, the turnover device 2 includes at least one group of turnover mechanisms 11. Each turnover mechanism 11 includes a turnover plate 12, a stop plate 13, a guide plate 14 and at least one guide rail 15; the turnover device 2 is connected with a second driving device 16 for driving the turnover plate 12 to rotate; a rotation shaft of the second driving device 16 is connected to the middle of the turnover plate 12; the turnover device 2 is used for turning over the medicine baskets; and the stop plate 13 is used for abutting against and stopping the medicine baskets. A pulley 17 matched with the guide rail 15 is arranged at one end of the guide plate 14, and moves in the guide rail 15; the turnover plate 12 is fixedly connected with the stop plate 13; the guide plate 14 is rotationally connected with the stop plate 13; and the second driving device 16 drives the guide plate 14 to move while driving the turnover plate 12 to rotate. Each guide rail 15 includes a turnover section 18, a discharging section 19 and a resetting section 20; when the guide plate 14 moves to the turnover section 18, the guide plate 14 is used for limiting the medicine basket; and when the guide plate 14 moves to the discharging section 19, an inclined surface inclining to the separation device 3 is formed on the guide plate 14, so that the medicine basket slides down to the separation device 3 along the inclined surface. A plurality of conveying rollers 21 are arranged on the turnover plates 12. Each guide plate 14 includes a rotating end and a moving end. The center of the second driving device 16 is set as a point O; the starting point of the turnover section 18 is set as a point A; and the terminating point of the turnover section is set as a point B. The turnover section 18 is of an arc shape; the center of the turnover section 18 coincides with the point O; and the radius of the turnover section 18 is equal to a distance between the moving end and the point O when the guide plate 14 is in a horizontal state. When the moving end is located at the point A, the guide plate 14 is in a horizontal state; and when the moving end moves in the turnover section 18, the guide plate 14 is parallel to the turnover plate 12, so that the point B and the point O are located at the same horizontal height. The terminating point of the discharging section 19 is set as a point C; and the discharging section 19 is tangent to the turnover section 18. When the moving end moves to the point C, the guide plate 14 is inclined to the separation device 3. An angle formed between the stop plate 13 and the turnover plate 12 is 45 degrees; and when the moving end moves to the point C, the guide plate 14 and the stop plate 13 are in a straight line. The reset section 20 includes a first reset section 22 and a second reset section 23. A connecting point between the first reset section 22 and the second reset section 23 is set as a point D. The first reset section 22 is of an arc shape and is tangent to the discharging section 19; and the second reset section 23 is tangent to the first reset section 22 and the turnover section 18, respectively.

The medicine basket is firstly conveyed to the turnover plate 12 and stopped by the stop plate 13. At this time, the guide plate 14 is parallel to the turnover plate 12; and the distance between the guide plate 14 and the turnover plate 12 is equal to or slightly greater than the height of the medicine basket. A bottom surface, a side surface and a top surface of the medicine basket are respectively limited by the turnover plate 12, the stop plate 13 and the guide plate 14. When the moving end of the guide plate 14 moves in the turnover section 18, the guide plate 14 keeps immobile relatively to the turnover plate 12, so that the medicine basket is turned over together with the turnover plate 12. Since the top of the basket is covered by the guide plate 14, the medicine bottles and the medicine bags in the medicine basket will not fall in the turnover process. When the moving end of the guide plate 14 moves to the terminating point B of the turnover section 18, the medicine basket is basically turned over; and the guide plate 14 bears the medicine baskets, the medicine bottles and the medicine bags at this moment. The moving end of the guide plate 14 starts to move in the discharging section 19; and the guide plate 14 starts to incline to the separation device 3 at this moment. When the moving end of the guide plate 14 moves to the terminating point C of the discharging section 19, the moving end of the guide plate 14 is docked with the separation device 3, so that the medicine baskets, the medicine bottles and medicine bags slide down to the separation device 3 along the guide plate 14. The turnover plate 12 continues to rotate to drive the guide plate 14 to move, so that when the moving end of the guide plate 14 moves to point A, the guide plate 14 is restored to be parallel to the turnover plate 12, so that the next turnover work for the medicine basket can be carried out. The medicine checking assembly line provided by the present invention enables the medicine basket to be turned over more stably, can prevent the medicine baskets, the medicine bags and the medicine bottles from falling in the turnover process, and can also prevent the medicine bottles from breaking in the turnover process, thereby eliminating potential safety hazards. In addition, after the medicine baskets are turned over, the medicine baskets, the medicine bottles and the medicine bags can be quickly discharged to the separation device 3, thereby realizing high working efficiency.

Preferably, two turnover mechanisms 11 are provided; and two groups of turnover mechanisms 11 are uniformly distributed on the turnover device 2. The medicine checking assembly line provided by the present invention enables one group of turnover mechanisms 11 to be restored to an initial state while the other group of turnover mechanisms 11 turns over and discharges the medicine basket, thereby saving time and improving the working efficiency.

More specifically, the separation device 3 includes two medicine basket conveyor belts 24 and at least two medicine bag conveyor belts 25 arranged between the medicine basket conveyor belts 24. A gap distance between the medicine basket conveyor belts 24 is greater than the length of the medicine bags. The medicine bag conveyor belts 25 include medicine bag bearing conveyor belts 26 and medicine bag discharging conveyor belts 27; the medicine bag bearing conveyor belts 26 and the medicine basket conveyor belts 24 are located on the same plane; and the medicine bag discharging conveyor belts 27 are inclined towards the medicine bag stacking device 5. The medicine bottle recycling device 4 is arranged at starting ends of the medicine basket conveyer belts 24; and the medicine basket stacking device 6 is arranged at terminating ends of the medicine basket conveyor belts 24. When the medicine basket slides down from the guide plate 14, both sides of the medicine basket are held on the medicine basket conveyor belts 24 and the medicine bags are held on the medicine bag bearing conveyor belts 26; the medicine bottles fall into the medicine bottle recycling device 4 from gaps between the medicine basket conveyor belts 24 and the medicine bag conveyor belts 25; the medicine baskets and the medicine bags are conveyed along the medicine basket conveyor belts 24 and the medicine bag conveyor belts 25 to one side far away from the turnover device 2; the medicine basket falls into the medicine basket stacking device 6 from the tail end of the medicine basket conveyor belt 24; the medicine bags are conveyed from the medicine bag bearing conveyor belts 26 to the medicine bag discharging conveyor belts 27 and are conveyed to the inclined bottom along with the medicine bag discharging conveyor belts 27 until the medicine bags fall to the medicine bag stacking device 5 from the tail ends of the medicine bag discharging conveyor belts 27. The medicine checking assembly line provided by the present invention enables the medicine baskets, the medicine bags and the medicine bottles to be separated rapidly, thereby facilitating the recycling of the medicine baskets, the distribution of the medicine bags and the discarding of the medicine bottles.

More specifically, the medicine basket stacking device 6 includes a basket body 28 and a limiting block 29 arranged inside the basket body 28; an elastic piece 30 is arranged between the basket body 28 and the limiting block 29; and the medicine baskets enter the basket body 28 and are buckled on the limiting block 29. A first medicine basket entering the basket body 28 is buckled on the elastic piece 30; and the elastic piece 30 is pressed downwards to leave a corresponding space for the next medicine basket under the action of gravity of the medicine basket, thereby facilitating the discharging of the next medicine basket. The medicine checking assembly line provided by the present invention enables the medicine baskets entering the basket body 28 first or later to enter smoothly, thereby preventing the medicine baskets from being damaged.

More specifically, each medicine bag stacking device 5 includes a basket body 28 and a stacking platform 31 arranged inside the basket body 28; and an elastic piece 30 is arranged between the stacking platform 28 and the limiting block 29. The medicine bags are stacked on the stacking platform 31, so that the elastic piece 30 is pressed down by the weight of the medicine bags. The medicine checking assembly line provided by the present invention enables the medicine bags to smoothly fall onto the stacking platform 31, thereby preventing the medicine bags from being damaged due to the excessively high discharging height of the medicine bags.

The specific embodiments described herein are only examples of the spirit of the present invention. Those skilled in the art can make various modifications, supplements or similar substitutions to the described specific embodiments without departing from the spirit of the present invention or going beyond a scope defined by the appended claims.

Although a number of terms are used herein, the possibility of using other terms is not excluded. These terms are used merely for describing and explaining the essence of the present invention more conveniently; and it is contrary to the spirit of the present invention to explain the terms as any additional limitations.

What is claimed is:

1. A medicine checking assembly line, comprising a conveying device, a turnover device, a separation device, a medicine bottle recycling device, a medicine bag stacking device and a medicine basket stacking device, which are connected sequentially;

wherein the conveying device is used for transferring medicine baskets between medicine dissolving personnel and medicine checking personnel;

the turnover device is used for turning over the medicine baskets;

the separation device is used for separating the medicine baskets, medicine bottles and medicine bags;

the medicine bottle recycling device is used for recycling the used medicine bottles;

the medicine bag stacking device is used for stacking and collecting the medicine bags;

the medicine basket stacking device is used for stacking and recycling the medicine baskets;

the conveying device comprises conveying rotation shafts, a first conveyor belt and a first driving device for driving the first conveyor belt to run; the first conveyor belt is laid on the conveying rotation shafts for conveying the medicine baskets;

the turnover device comprises at least one group of turnover mechanisms and a second driving device;

each turnover mechanism comprises a turnover plate, a stop plate, a guide plate, at least one guide rail and a pulley; the second driving device is configured for driving the turnover plate to rotate; the second driving device is connected to the middle of the turnover plate; the turnover device is used for turning over the medicine baskets; the stop plate is used for abutting against and stopping the medicine baskets; the pulley matched with the guide rail is arranged at one end of the guide plate, and moves in the guide rail; the turnover plate is fixedly connected with the stop plate; the guide plate is rotationally connected with the stop plate; the second driving device drives the guide plate to move while driving the turnover plate to rotate; each guide rail comprises a turnover section, a discharging section and a resetting section; when the guide plate moves to the turnover section, the guide plate is used for limiting the medicine basket; and when the guide plate moves to the discharging section, an inclined surface inclining to the separation device is formed on the guide plate, so that the medicine basket slides down to the separation device along the inclined surface.

2. The medicine checking assembly line according to claim 1, wherein the turnover plate comprises a plurality of conveying rollers arranged on the turnover plate.

3. The medicine checking assembly line according to claim 1, wherein each guide plate comprises a rotating end and a moving end; the center of the second driving device is set as a point O; the starting point of the turnover section is set as a point A; the terminating point of the turnover section is set as a point B; the turnover section is of an arc shape; the center of the turnover section coincides with the point O; the radius of the turnover section is equal to a distance between the moving end and the point O when the guide plate is in a horizontal state; when the moving end is located at the point A, the guide plate is in a horizontal state; and when the moving end moves in the turnover section, the guide plate is parallel to the turnover plate, so that the point B and the point O are located at the same horizontal height.

4. The medicine checking assembly line according to claim 1, wherein the terminating point of the discharging section is set as a point C; the discharging section is tangent to the turnover section; and when the moving end moves to the point C, the guide plate is inclined to the separation device.

5. The medicine checking assembly line according to claim 3, wherein an angle formed between the stop plate and the turnover plate is 45 degrees; and when the moving end moves to the point C, the guide plate and the stop plate are in a straight line.

6. The medicine checking assembly line according to claim 1, wherein the reset section comprises a first reset section and a second reset section; a connecting point between the first reset section and the second reset section is set as a point D; the first reset section is of an arc shape and is tangent to the discharging section; and the second reset section is tangent to the first reset section and the turnover section, respectively.

7. The medicine checking assembly line according to claim 1, wherein the separation device comprises two medicine basket conveyor belts and at least two medicine bag conveyor belts arranged between the medicine basket conveyor belts; a gap distance between the medicine basket conveyor belts is greater than the length of the medicine bags;

the medicine bag conveyor belts comprise medicine bag bearing conveyor belts and medicine bag discharging conveyor belts; the medicine bag bearing conveyor belts and the medicine basket conveyor belts are located on the same plane; the medicine bag discharging conveyor belts are inclined towards the medicine bag stacking device; the medicine bottle recycling device is arranged at starting ends of the medicine basket conveyer belts; and the medicine basket stacking device is arranged at terminating ends of the medicine basket conveyor belts.

8. The medicine checking assembly line according to claim 1, wherein the medicine basket stacking device comprises a basket body, a limiting block arranged inside the basket body and an elastic piece; in the medicine basket stacking device, the elastic piece is arranged between the basket body and the limiting block, and the medicine basket enters the basket body and is buckled on the limiting block;

the medicine bag stacking device comprises a basket body, a stacking platform arranged inside the basket body and an elastic piece; in the medicine bag stacking device, the elastic piece is arranged between the stacking platform and the basket body.

\* \* \* \* \*